Nov. 11, 1941.      C. I. McNEIL ET AL      2,262,329
INTERNAL COMBUSTION ENGINE
Filed Dec. 30, 1936
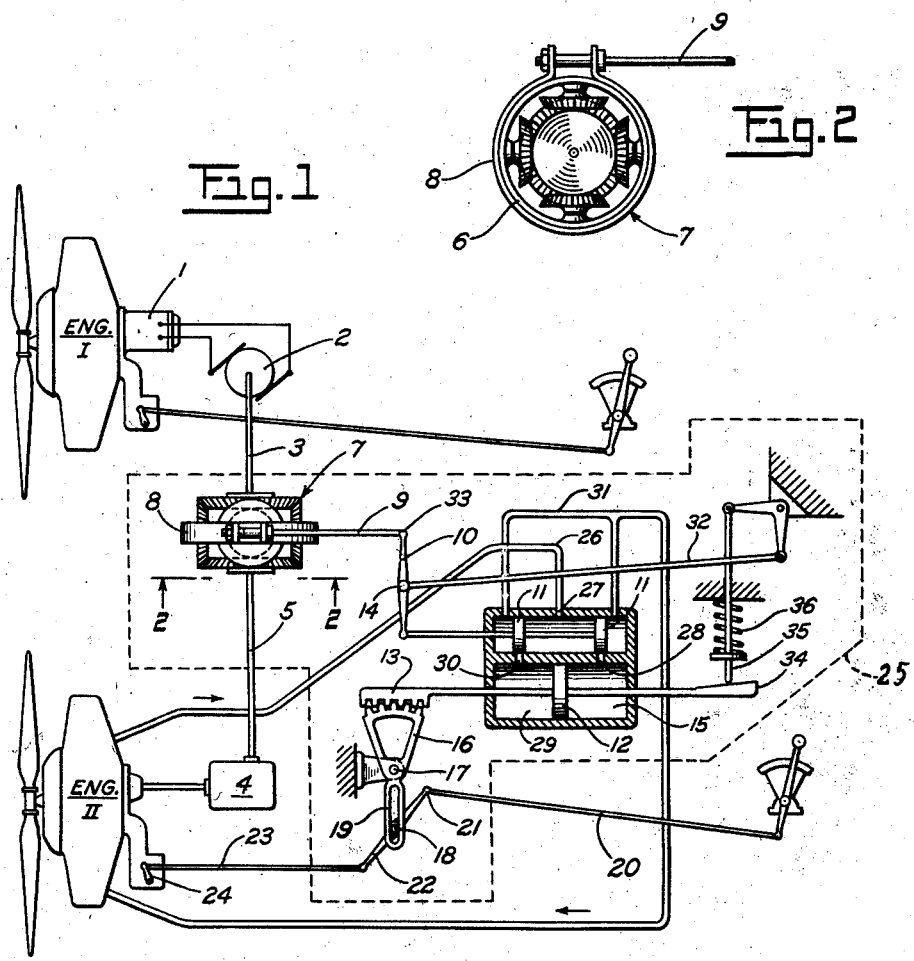
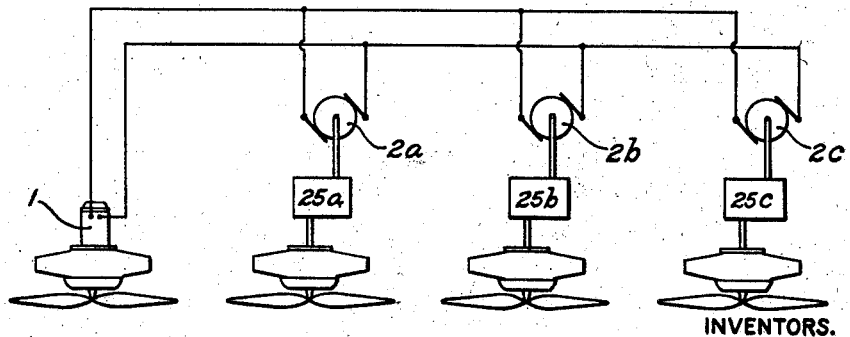
INVENTORS.
Charles I. McNeil
Donald M. Berges
BY
ATTORNEY Patented Nov. 11, 1941

2,262,329

UNITED STATES PATENT OFFICE 2,262,329

INTERNAL COMBUSTION ENGINE

Charles I. McNeil, East Orange, and Donald M. Berges, Orange, N. J., assignors to Eclipse Aviation Corporation, East Orange, N. J., a corporation of New Jersey Application December 30, 1936, Serial No. 118,423

5 Claims. (Cl. 60—97)

The invention relates to a novel and useful method and mechanism for controlling the angular velocity of a rotating body or bodies. More particularly, the invention relates to such a method and mechanism for controlling a motor or plurality of motors and maintaining them in synchronous rotation with a master motor or other standard rotating member.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawing, referred to herein and constituting a part hereof, illustrates one embodiment of the invention, and together with the description, serves to explain the principles of the invention.

Of the drawing:

Fig. 1 is partially diagrammatic or schematic, and shows a preferred embodiment of the invention applied to the motors of a two-motor airplane;

Fig. 2 is a view along the line 2—2 of Fig. 1; and

Fig. 3 is a diagram showing the electrical system as applied to two or more engines to be controlled by the speed of a single master engine.

The invention provides a novel and useful method and mechanism for controlling or governing the angular velocity or rotation of a rotating body or bodies, such as internal combustion motors, turbines, or any other mechanisms which have rotary motion or a motion which can be converted into rotation for the purposes of such control.

One object of the invention is to provide a method and means for accurately determining the actual differences in rotary velocity of two rotating bodies and utilizing the determined differences for automatic governing of said body or bodies.

By virtue of the present invention it is possible to automatically maintain any number of motors in synchronized rotation, either at the same R. P. M., or at any selectively predetermined and variable ratio of angular velocities.

Preferably, a master control shaft driven by or connected to rotate proportionately to the master motor, and a shaft driven by or rotating proportionately to the motor to be governed are connected by differential gearing. The housing or other portion of the differential gearing which normally idles in mesh with the driven gears is adapted to move proportionately to the differences in rotation between the master control shaft and the governed shaft. These movements of the differential housing are automatically transmitted to the throttle or other speed-control mechanism of the governed motor so as to speed up or slow down the motor and thus bring the gears of the differential into synchronism.

Referring now in detail to the present preferred embodiment of the invention, illustrated by way of example in the accompanying drawing, the invention provides a unit controlling or synchronizing device generally designated at 25, which automatically detects and measures differences between the angular velocity of the standard or master rotating body or motor I and the body or motor II to be controlled. As embodied, the unit synchronizing device comprises an epicyclic gear train, preferably arranged in the form of a bevel gear differential 7 (Fig. 2) although other forms of epicyclic gearing and differentials may be used. The arrangement of the differential gearing is such that one gear rotates with or is driven from the master or standard rotating body I, a second gear being driven in the opposite direction from the body or motor II to be controlled, while a third element of the gear train, in accordance with the principles of differential gearing, normally idles in mesh with the other two driven gears and moves proportionately to the differences in the angular velocities thereof.

This movement is transmitted to a sliding valve 11 (Fig. 1) of a servo-motor to actuate a rack and sector combination shown at 13 and 16, to shift the setting of throttle 24 of the engine II to be brought into synchronism with engine I.

A small alternating current generator I driven by engine I drives a small synchronous motor 2 causing its shaft 3 to revolve with a speed which is always proportional to the speed of engine I. Engine II drives a gear box unit 4 by a direct mechanical drive which causes shaft 5 to rotate with a speed which is always proportional to the speed of engine II. The gear reduction in the synchronous motor 2 and the gear box 4 are so chosen that when engines I and II are exactly in synchronism the shafts 3 and 5 will be revolving with exactly the same speeds but in opposite directions. This means that when engines I and II are in synchronism the cage 6 holding the pinions of differential 7 will remain motionless. Should the engines go out of synchronism the cage 6 will immediately start to revolve, its direction of rotation depending upon which engine is rotating the faster. The motion of cage 6 is transmitted through clutch 8 to rod 9 which in turn moves lever 10 about its fulcrum 14, thereby displacing valve 11 to the right from the neutral position shown, and allowing communication to be established between chamber 15 of the servo-motor, and the oil pumping system of engine II, by way of ports 28 and 27 and conduit 26. The resulting pressure increase in chamber 15, in conjunction with the discharge of oil from chamber 29 (through port 30 and conduit 31 leading back to the oil reservoir or crank-case of the engine) will cause piston 12 to move to the left and thereby move gear segment 16 to rotate about center 17. Fulcrum 18 of lever 22 is adjustable in slot 19 so that a given motion of segment 16 will give the desired motion of lever 22. Thus the motion of piston 12 is a "servo" motion controlled by differential 7 and the "follow-up" action of valve 11 is brought about by the action of linkage 32 upon the lever 10 to swing said lever about upper fulcrum 33, thereby restoring valve 11 to the cut-off position shown; linkage 32 being actuated by the cam and follower shown at 34 and 35, and movable with the piston 12, the spring 36 being provided to hold the follower 35 in proper relation to the cam 34 at all times.

An example of operation in an aircraft installation is as follows:

The pilot sets the throttle of the master engine (engine I) at the desired setting and the throttle of the controlled engine (engine II) at approximately the desired setting. If the two engines are not exactly in synchronism the differential cage 6 through the servo mechanism causes shaft 18 to move, not about its own center but about center 17. As rod 20 is held firmly by the quadrant lever, point 21 becomes the fulcrum of lever 22 and the movement of point 18 causes rod 23 to move slightly, in turn adjusting the throttle 24 of engine II. This adjusting motion continues until engine II and engine I are in synchronism. At this point differential cage 6 ceases to move and the unit has completed its cycle.

Clutch 8 is provided to prevent damage to any part of the system should, for any reason, the engines not synchronize. When rod 9 reaches a position in which it has caused valve 11, 11 to abut either end wall of the valve housing, if the engines are not synchronized, the differential cage continues to move but clutch 8 slips, preventing damage.

Preferably the parts actuated by the synchronous motor 2 of the controlled engine will be enclosed in a suitable housing, indicated at 25 in Fig. 1; and when there are additional motors, as 2a, 2b and 2c (Fig. 3) for additional engines to be governed by the master engine I, these may likewise have their corresponding units enclosed in similar housings, as at 25a, 25b and 25c in Fig. 3.

What is claimed is:

1. In an aircraft having a plurality of propellers which are required to rotate in fixed speed relation, each propeller having an engine for driving it including means for controlling the speed thereof, manually operable means for actuating the speed controlling means of one of said engines, and automatically operable means for actuating the speed controlling means of a second engine to maintain the speed of the latter in synchronism with the first engine said automatically operable means comprising first, a gear train at said second engine and driven thereby, at a speed proportional to the speed of said second engine, secondly, means including a generator operated by the first engine for generating and supplying an alternating current at a frequency corresponding to the speed of said first engine, and thirdly, means responsive to a difference between the speed of said generator and said gear train to cause movement of the speed controlling means, for the second engine, said last named means including an electric motor having electrical connections with said generator, for synchronous rotation therewith.

2. In combination with two spaced-apart internal combustion engines, synchronizing means including an electrical current generator adjacent one of said engines, an electric motor adjacent the other engine, electrical connections between said generator and motor for causing operation of the latter in synchronism with the former, and speed deviation responsive means driven partly by said electric motor and partly by said second-named engine to control the speed of said second-named engine, said speed deviation responsive means being disposed, in its entirety, in space adjacent said second engine and relatively remote from said first-named engine.

3. In combination with two spaced-apart internal combustion engines, synchronizing means therefor including a transmitting element adjacent one of said engines, a receiving element adjacent the other engine, connections between said transmitting and receiving elements for causing the latter to move in synchronism with the former, and speed deviation responsive means driven partly by said receiving element and partly by said second-named engine to control the speed of said second-named engine, said speed deviation responsive means being disposed, in its entirety, in space adjacent said second engine and relatively remote from said first-named engine.

4. In a synchronizing device for matching the speeds of jointly operating engines provided with speed controlling mechanisms, the combination of a differential mechanism having one side driven by one engine in one direction, and the other side driven by the other engine in the opposite direction, hydraulic means driven by said differential sides when the speed of one engine differs from the speed of the other, means operatively connecting said hydraulic means with the speed controlling mechanism of at least one of said engines, yieldable means forming part of the drive to said hydraulic means, and means for limiting the movement of said hydraulic means to thereby cause release of the drive to said hydraulic means by reason of the yielding of said yieldable means.

5. In a mechanism for synchronizing the speed of a controlled motor with that of a master motor, a speed controlling device on said controlled motor, a valve operatively connected therewith, a differential mechanism driven by said motors and acting to shift said valve whenever the speeds of said motors differ, and means for stopping movement of said valve notwithstanding the continued exertion of a valve shifting force by said differential mechanism, said stopping means being adapted to come into action after said valve has moved a predetermined distance.

CHARLES I. McNEIL.
DONALD M. BERGES.